United States Patent [19]

Sheflott et al.

[11] Patent Number: 5,802,493

[45] Date of Patent: Sep. 1, 1998

[54] METHOD AND APPARATUS FOR GENERATING A PROPOSAL RESPONSE

[75] Inventors: Leonard J. Sheflott, Avon; Marion A. Wildeman, Glastonbury, both of Conn.; Salvador Aleguas, III, Martinez, Calif.; Joseph L. Murgo, Manchester, Mo.; Pamela Lane Jordan, East Hampton, Conn.; Jill Matus Gregory, Westbrook, Conn.; Carole A. Pincavage, Glastonbury, Conn.; Anthony Cipriani, Middletown, Conn.; Robert Goldman, South Windsor, Conn.

[73] Assignee: Aetna Life Insurance Company, Hartford, Conn.

[21] Appl. No.: 350,949

[22] Filed: Dec. 7, 1994

[51] Int. Cl.⁶ .................................................. G06C 17/60
[52] U.S. Cl. ............................ 705/1; 395/604; 395/615
[58] Field of Search ................................. 395/201, 793, 395/759, 604, 615

[56] References Cited

U.S. PATENT DOCUMENTS

| | | | |
|---|---|---|---|
| 4,766,539 | 8/1988 | Fox | 364/401 |
| 4,831,526 | 5/1989 | Luchs et al. | 364/401 |
| 4,975,840 | 12/1990 | DeTore et al. | 364/401 |
| 5,224,206 | 6/1993 | Simoudis . | |
| 5,463,768 | 10/1995 | Cuddihy et al. | 395/183.13 |

OTHER PUBLICATIONS

RFP©; A/E Management Services, Inc. Version 7.2 April., 1994.

*Primary Examiner*—Gail O. Hayes
*Assistant Examiner*—William Hughes
*Attorney, Agent, or Firm*—McCormick, Paulding & Huber

[57] ABSTRACT

A system for generating a document in response to a request for information has the capability of receiving scanned documents that have a series of questions. The present invention has databases of questions and associated answers. A respondent prepares the subject questions for a searching procedure by editing and assigning each question with a number and labels the same with given input parameters. The system searches the question database for a question which exactly matches the subject question or is a like match in that it is similar in text or input parameter value. The system compares each received question with stored questions and return similarly worded questions in accordance with a predetermined match threshold. The respondent may then select an answer associated with the subject question for inclusion in the response document. The present system is also characterized by a maintenance apparatus that allows for systematic upkeep of question and answer databases.

14 Claims, 11 Drawing Sheets

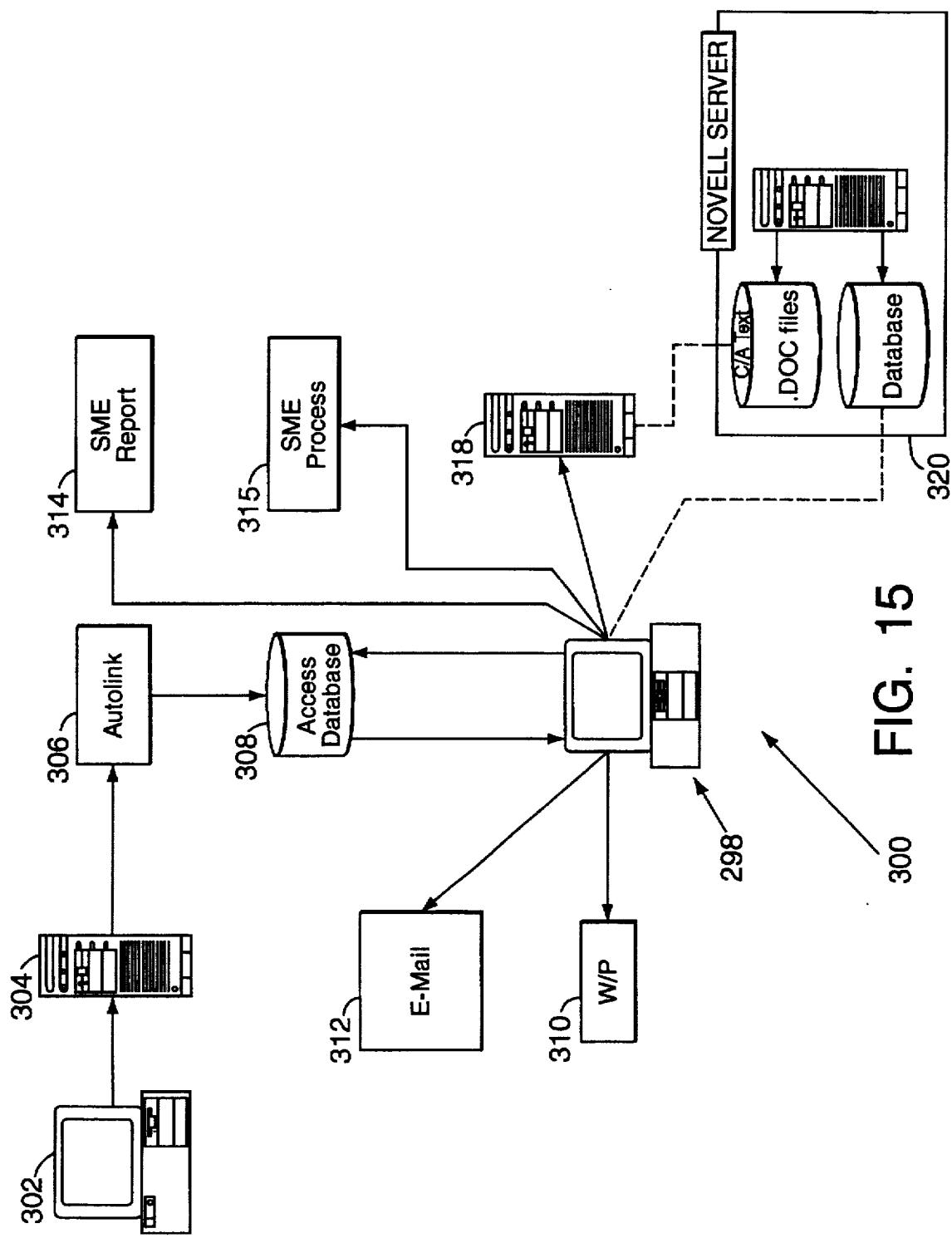

METHOD AND APPARATUS FOR GENERATING A PROPOSAL RESPONSE

TECHNICAL FIELD

This application relates generally to information processing systems and more particularly to a method and apparatus for generating responses to questionnaires.

BACKGROUND OF THE INVENTION

Companies in the business of insuring against risk of loss have recently undergone tremendous pressures from consumers and government agencies as the price of traditional indemnification programs has sky-rocketed. This situation is most visible in the health insurance industry where concerns over costs and accessibility have prompted a national debate which goes to the foundation of the nation's health care system. Competitive and governmental pressure have resulted in insurance companies developing products and services which heretofore did not exist.

Traditional health insurance which dominated the market until the middle of the last decade was basically a "fee for service" or indemnification program in which insurance companies assessed the insured a premium based primarily upon the claims history for an individual or class of individuals. Individuals had complete freedom of choice in their selection of health care providers. A similar product offered at that time was one in which an insurance company only provided claim administration services for the company or group without indemnifying, per se, the company against actual loss. While most individuals purchased health insurance through their employer, many obtained insurance directly from the insurance companies. In general, the operation of the health care industry was simple. An individual or family member saw a physician, paid the bill and submitted the same to the insurance company for reimbursement.

Hospital bills were often paid directly by the insurance company.

In the middle 1970's, health maintenance organizations (HMOs) found popularity as medical costs for employers began to rise. HMOs rely on a subset of doctors and hospitals in the community upon which participants must rely.

Consequently, HMOs restrict the choice of doctors. Moreover, certain doctors act as "gatekeepers" in that they must be seen first prior to visits with specialists. HMOs eliminate forms and have only a nominal per visit payment requirement on the part of the participant. Traditional indemnification programs and HMOs mark the general boundaries of the health insurance product spectrum.

Health costs accelerated dramatically in the 1980's. Millions could no longer afford to purchase health insurance directly, and employers found that health insurance, once a "fringe" benefit, now became a significant cost component to their product or service. In response, insurance companies began to seek ways of bringing new products and services to the market to contain costs and more efficiently utilize the health care dollars being spent by the consumer. In addition to the HMO and fee for service plans, other products and services have evolved in the last five or six years. These include managed indemnity programs in which certain utilization management procedures have been put in place. For example, while a participant retains the right to select his or her physician, there are requirements for hospital confinement precertifications in order to better control the costs over a pure indemnity program. Moving again towards an HMO structure, another new product is a "PPO" or a preferred provider organization. PPOs allow a limited choice of doctors and preference is given to "plan" doctors who provide discounts in fees charged the insurance companies in return for the higher rate of referral. Point of service health plans (POS) are characterized by preferred providers who have gatekeeper functions in that a primary care physician has control of the case. The discounts obtained from the doctors with these plans are more aggressive than with PPOs. For both PPO and POS plans, there is a "non-preferred" level of benefits which allows members the freedom of choice to use non-preferred providers, but at a lower benefit level. These features distinguish these products from an HMO.

As demonstrated above, the number of health insurance products has expanded greatly in the last few years and has caused a vast change in the manner in which health insurance companies formulate their products to be sold to the consumer. Organizations such a labor unions or employers are the entities through which the overwhelming majority of health insurance policies are purchased.

These organizations vary in size from many thousands of insured down to individual policies. For sales purposes, the health insurance market may be subdivided into several segments based on the number of potential insured; those "national" entities having over 5,000 persons, a middle range in which 300 to 5,000 individuals are involved in a plan and a "small" market in which the entities are less than 300 insured lives.

In large measure, health insurance companies are solicited to provide a quote by consultants who deal directly with the organizations or employers. The consultant has met with the "customer", typically the benefits administrator of a company or organization, to obtain needed information on prospective enrollees and the plan requirements. The consultant thereafter generates a request for proposal (RFP) to be circulated around several competing health insurance companies. The RFP is comprised, in part, of a series of questions for the insurance company on its products, company policies and company requirements vis a vis the individuals to be insured, should the insurance company be awarded the contract.

During the time in which the fee for service or simple indemnification programs were dominant, these questionnaires were generally brief; with simple questions that were answered by individuals typically located at the home office of the insurance company. Answers to the questions were based upon previous responses generated for prior RFPs, as well as some input from subject area experts and actuaries. As a result, the time required to generate the response to the RFP was relatively brief; requiring little input from either regional sales offices or subject area experts outside the home office.

However, with the proliferation of new health care products and services, insurance companies began receiving RFP's which increased in length from several dozen questions to several hundred. Moreover, the complexity of the questions has risen and their scope exceeds that of previous years. Legal ramifications of the insurance company's responses have expanded. No longer can the home office simply generate a response. Answers are now short lived, and must be generated by interaction with resources located at disparate points in the company, as well as by local network and utilization management resources. The response time needed by the insurance company to respond to a given RFP in a quality manner has lengthened, while response deadlines established by the consultants have increasingly shortened.

This new situation has enormously changed the mechanics of the insurance company in generating a response. Some health insurance companies relied on a paper manual which contained a list of questions and appropriate answers to be provided in response to an RFP. This procedure required an individual to examine the questionnaire and personally compare each question with the questions contained in the manual. Once a suitable match was found, the answer with the newly located question was copied by the respondent onto a response form. Unfortunately, the paper manual became out of date almost as soon as it was printed; requiring the individual preparing the response to double check the appropriateness of the manual's answers with the appropriate personnel in the company, both at the local or regional office as well as company headquarters.

Moreover, many questions were simply not found in the paper manual. The respondent then was required to contact a subject area expert within the company to discuss the question on the merits and generate a answer. As different RFP's were being processed in parallel, many questions were repeated.

Consequently, subject area experts were bombarded with the same questions from a variety of respondents; lowering the productivity of these individuals and lengthening the time needed to reply. Other factors caused the overall response process to slow dramatically. The respondent now needed to determine whether an answer was appropriate for that RFP. The new range of health insurance products meant that the same question may have a different response based on a particular product, geographic location or other parameter.

Subsequent attempts have been made in computerization of the process in which a variety of questions and corresponding answers were stored in a word processor file which could be accessed by individuals at remote locations.

However, no system was in place which would allow a question sort on any criteria other than a word match. Moreover, there was no indication of the compatibility of the questions with a particular product or whether that particular question had been updated or received legal review.

It would be advantageous, therefore, to have a system for use in responding for proposals which receives questions propounded in a Request for Proposal in a manner that allows for comparison with each received question with a database of stored questions. Moreover, it would be advantageous to have a system which would return similarly worded questions in accordance with a predetermined match threshold between the text and input parameters associated with the question. The desirable system would enable a respondent to select an associated answer for inclusion in the final response document. The present system is drawn towards such an invention.

SUMMARY OF THE INVENTION

An object of the present invention is to provide a system enabling quick, consistent and accurate response to a request for information, including a questionnaire.

Another object of the present invention is to provide a system of the foregoing type which can be readily maintained with up to date information, thereby insuring accuracy of the response.

Still another object of the present invention is to provide a system of the foregoing type that can generate a response document having a standardized form without the direct input of a respondent.

Yet another object of the present invention is to provide a system of the foregoing type that can attach input parameters to each question in the questionnaire, thereby ensuring that an answer returned by the system is appropriate.

Another object of the present invention is to provide a system of the foregoing type that has a broad scope of distribution and one that reduces the number of redundant expert contacts, thereby increasing productivity.

According to the present invention, a method for generating a response document prepared in reply to a request that has a plurality of questions concerning a product, the method including the steps of receiving signals indicative of the questions in a text form; formatting the question text signals into a corresponding plurality of individual questions; assigning identifier signals to each of the individual formatted question signals and associating with the formatted question signals, signals indicative of values of associated input parameters. The present method also includes the steps of searching a database having stored therein signals corresponding to a plurality of stored questions. Each of the stored questions have associated therewith input parameter signals. The stored questions further being associated with signals corresponding to at least one answer stored on an answer database. Further steps in the method are returning signals corresponding to one of the stored questions having text or input parameter signal values that matches a one of the subject question text or the corresponding input parameter signal values; selecting one of the stored answer signal values associated with the returned question; associating each of the subject question signal values with the corresponding one of the selected answer signal values; assembling the response document so that each of the subject questions and the corresponding answers are located in proximity with one another; and lastly, outputting the response document in a professionally finished format.

BRIEF DESCRIPTION OF THE DRAWINGS

FIG. 11 is a simplified schematic illustration of a screen displayed to the respondent showing question attributes.

FIG. 14 is a simplified schematic illustration of a screen displayed to the respondent showing the attributes of a selected answer.

FIG. 15 is a simplified diagrammatic illustration of several of the algorithms executed by maintenance apparatus of the system shown in FIG. 6.

DESCRIPTION OF THE PREFERRED EMBODIMENT

The present system was designed and developed to support the questionnaire response component of proposals made by an insurance company. Questionnaires are included in Requests for Proposals (RFP's) specifications provided by consultants/brokers with whom the insurance company does business. Questionnaires are very fluid in structure, varying from one case to another without standard format or a set of questions and without consistency between different products, sites and/or market segments. Moreover, there is no standard workflow in the questionnaire response process, so the present system is flexible enough to handle a myriad of questionnaire:

- formats (i.e., questions organized differently across consultants/brokers).
- contents (i.e., questions focused on different subject areas, detail, or complexity across consultants/brokers).
- workflows internal to sales support and accountabilities for proposal production.

Figure 1:
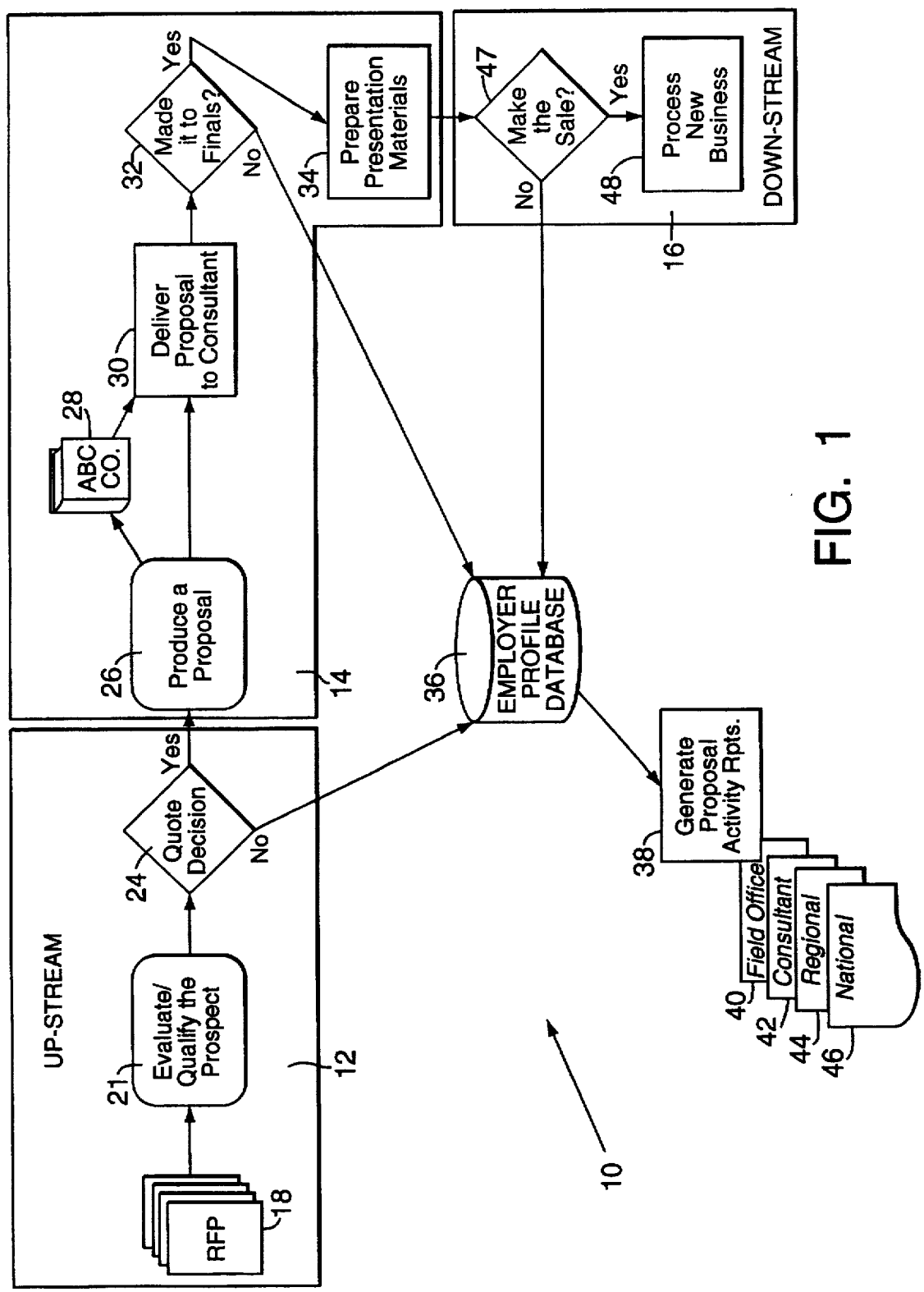
FIG. 1 is a simplified diagrammatic illustration of an exemplary proposal response process which can be utilized by health insurance companies in responding to a Request For Proposal (RFP).

Referring now to FIG. 1, there is shown a simplified diagrammatic illustration of the proposal response process 10 utilized by health insurance companies in responding to a Request For Proposal (RFP). The company's response as found in the response document is a basic vehicle that insurance companies, and especially health insurance companies, use in generating new business. The speed of the company in reacting and accuracy of the information as presented to the prospect company or organization is absolutely crucial to the success of marketing efforts.

The basic process can be divided into three components; upstream 12 in which the initial decision to produce the proposal is made; midstream 14 where the presentation materials are ultimately prepared. Lastly, there is a downstream portion 16, hopefully resulting in new business being received and processed. When a request for proposal 18 is received by the health insurance company the prospective employer or group is evaluated (block 21) to determine initially if the company wishes to respond. Once a decision has been made to generate a quote (block 24), work on the proposal is begun. As detailed hereinafter, the request for proposal received by the health insurance company contains a questionnaire with a large number of questions to be answered by the health insurance company. Most likely, a consultant or broker has submitted a similar RFP with the same questionnaire to a number of competing health insurance companies. The proposal (block 28) is produced at block 26. Thereafter, the completed proposal is delivered to the consultant at block 30. Once non-competitive bids have been screened at block 32, additional presentation materials are prepared for the broker and ultimately the prospective client (block 34). The information compiled during this process, including the initial decision to quote for the business, is provided to an employer profile database 36. A variety of reports are generated and provided to others in the organization including field, office personnel, the consultant, regional and national offices (blocks 38–46). Should the sale be made (block 47), the new business is processed by the appropriate departments in the insurance company (block 48).

Figure 2:
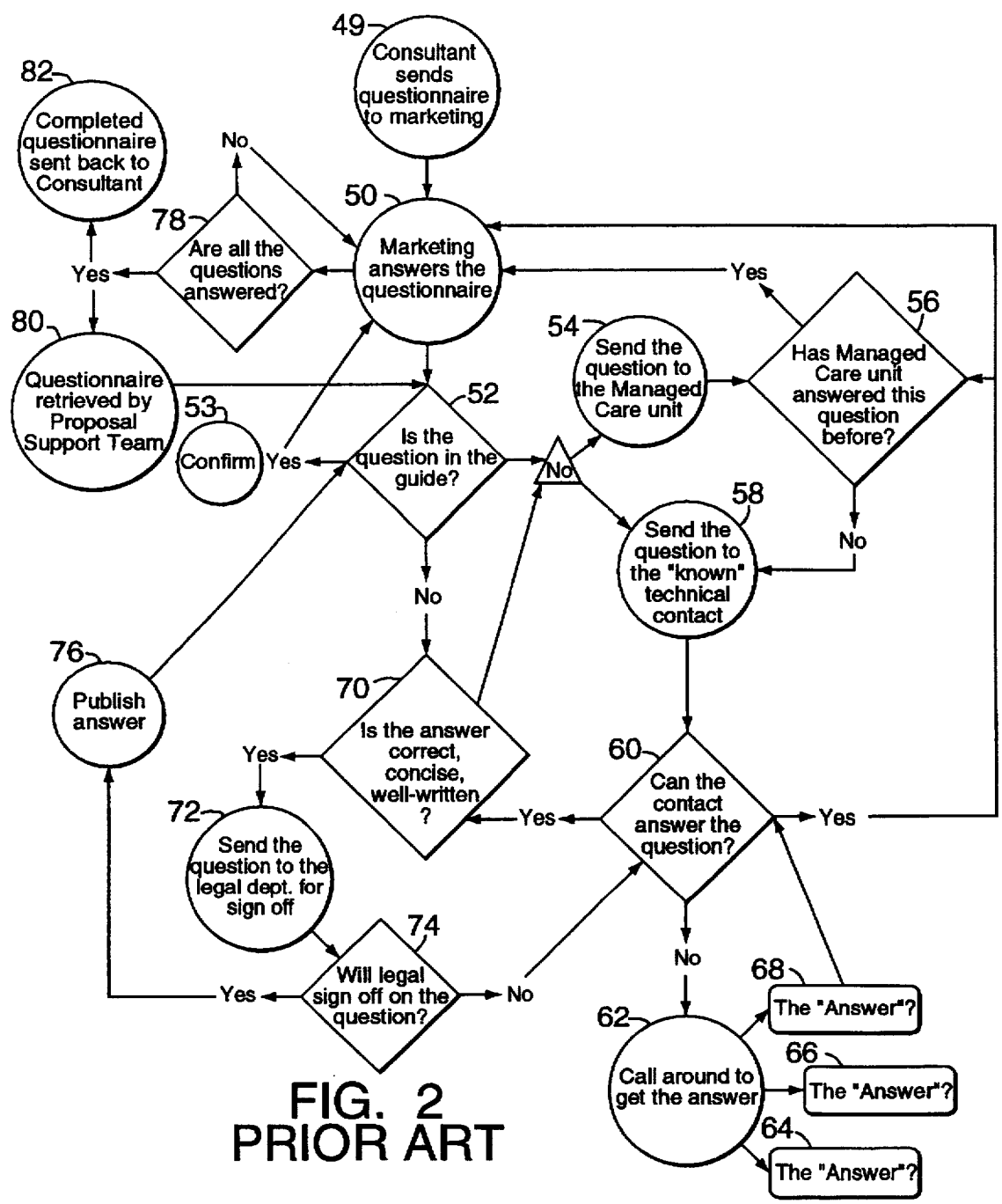
FIG. 2 is a simplified diagrammatic illustration illustrating workflow communication for responding to a consultant's question as performed by a prior art response system.

In order to complete the process shown in FIG. 1 and ultimately obtain the client's business, known systems utilize an inordinate amount of manual data input performed in a haphazard or random procedure that yields many inefficiencies. FIG. 2 diagrammatically illustrates typical communication work flow for a prior art system. Initially at block 49, the questionnaire is received by the marketing department home office. The respondent in the marketing department attempts to answer (block 50) each question of the questionnaire using a variety of sources including a manual, guide or catalog of answers in paper form. If so (block 52), that question is complete, so long as it has not been superseded or rendered obsolete as discovered during the confirmation process (block 53).

If no answer is found, the respondent in the marketing department must pursue several avenues of inquiry. Initially, the question can be sent to a managed care unit within the insurance company (block 54) who determines whether or not it has answered this question before (block 56). If so, it will provide the respondent with the answer. Alternatively, the question is sent to a technical expert to develop a new answer (block 58).

Often times the initial technical contact may not be able to answer the question (block 60), and the respondent must resort to "calling around" (block 62) within the company to locate an expert or equivalent source to obtain the answers (blocks 64–68). Once a contact has answered the question, it must be determined whether the answer is concise and well written (block 70). Thereafter, the question and answer is sent to the legal department (block 72) to verify that it is appropriate to be added to the Database. If the legal department approves the question and corresponding answer (block 74), it is published in an update for the paper manual (block 76). If not, a technical contact is, again, solicited for advice, and the above process repeated until, ultimately, a concise and well written answer is provided which will obtain all the necessary approvals. Once all the questions have been answered to the satisfaction to the respondent (block 78), the completed questionnaire is retrieved by a proposal support team (block 80) which maintains and updates the paper manual. Lastly, the questionnaire is sent back to the consultant (block 82) as part of the response document.

Figure 3:
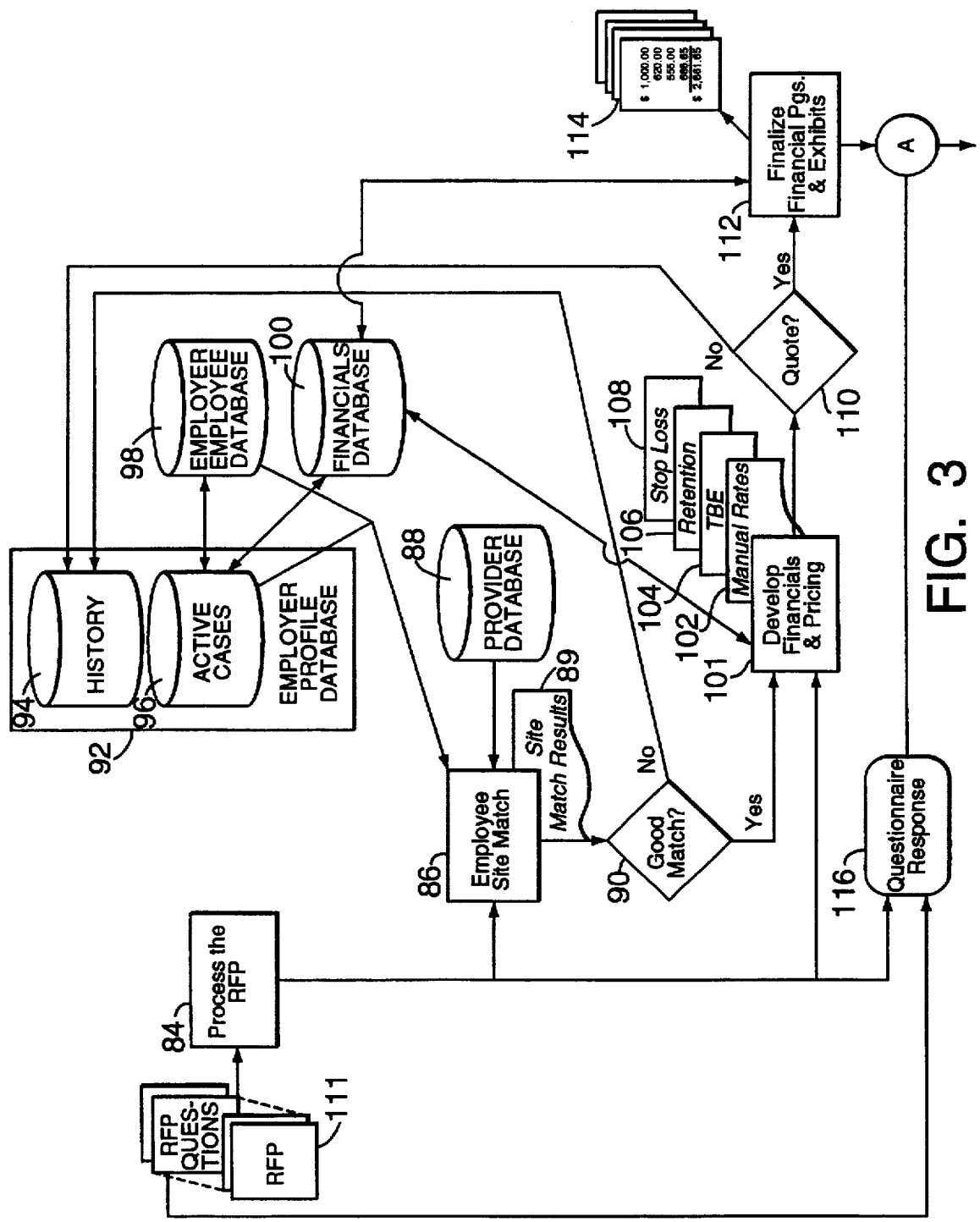
FIG. 3 is an expanded schematic illustration of a portion of the proposal response process illustrated in FIG. 1.

Referring now to FIG. 3, there is shown an expanded schematic illustration of a portion of the proposal response process illustrated in FIG. 1. One of the first avenues of inquiry in processing (block 84) the RFP entails an employee site match (block 86) which must be done to see whether or not the prospect company and its employees geographic locations are an appropriate match for the doctors and other health care providers that are associated with the proposed plan. To do so, a provider database 88 is accessed. Using the employee address location zip codes from the RFP, a zip code site match against the managed health care network locations would be performed to determine the insurance company's general provider network and product adequacy in the employees home addresses. The purpose of this analysis is that the percent saturation of the doctors and care locations that matches with the employer's employees' home address is an important factor in determining the appropriateness of competing for the business.

The site match results 89 are evaluated (block 90). If a good match is not obtained the analysis results are stored in an employer profile data base 92 comprised of two components. The first component 94 is a historical data base that serves as an archive of all proposed work, with a second data base component 96 of active cases for all responses to RFPs that are still pending. The active case data base is itself comprised of two sections, an employer/employee data base 98 containing information on the employer/employees personally as well as a financial data base 100 storing financial information associated therewith, including costs, etc.

Further analysis tests for favorable values of those parameters used by the insurance company during this process. The employer profile data base is prompted for additional known or speculated information on the prospect. This information is most likely a mix of objective/subjective and quantifiable/non-quantifiable data, each with a list of potential responses and waiting to calculate a final score. Examples of parameters evaluated in this process include the reason(s) this prospect is seeking insurance bids, the length of time the employer has been with its current carrier, the prospect's type of business, its financial condition, the quality of the RFP, the information provided with the RFP, the consultant's relationship with the prospect, the control of the consultant over the bid process, the consultant's relationship with this insurance company, other competitors for this business and whether this company has previously solicited a bid from the insurance company.

If the match is considered appropriate, financial parameters 101 such as pricing are developed using manual rates, TBE, retention, stop/loss and other considerations (blocks 102–108). The final decision regarding the quote for the business is made at block 110. If the decision is affirmative, the financial pages and exhibits are finalized and the response document including the answered questionnaire 111, is generated (blocks 112–116) as detailed hereinafter. If the ultimate decision is negative, this information is recorded in the employer profile data base with a rationale for the decision.

Figure 4:
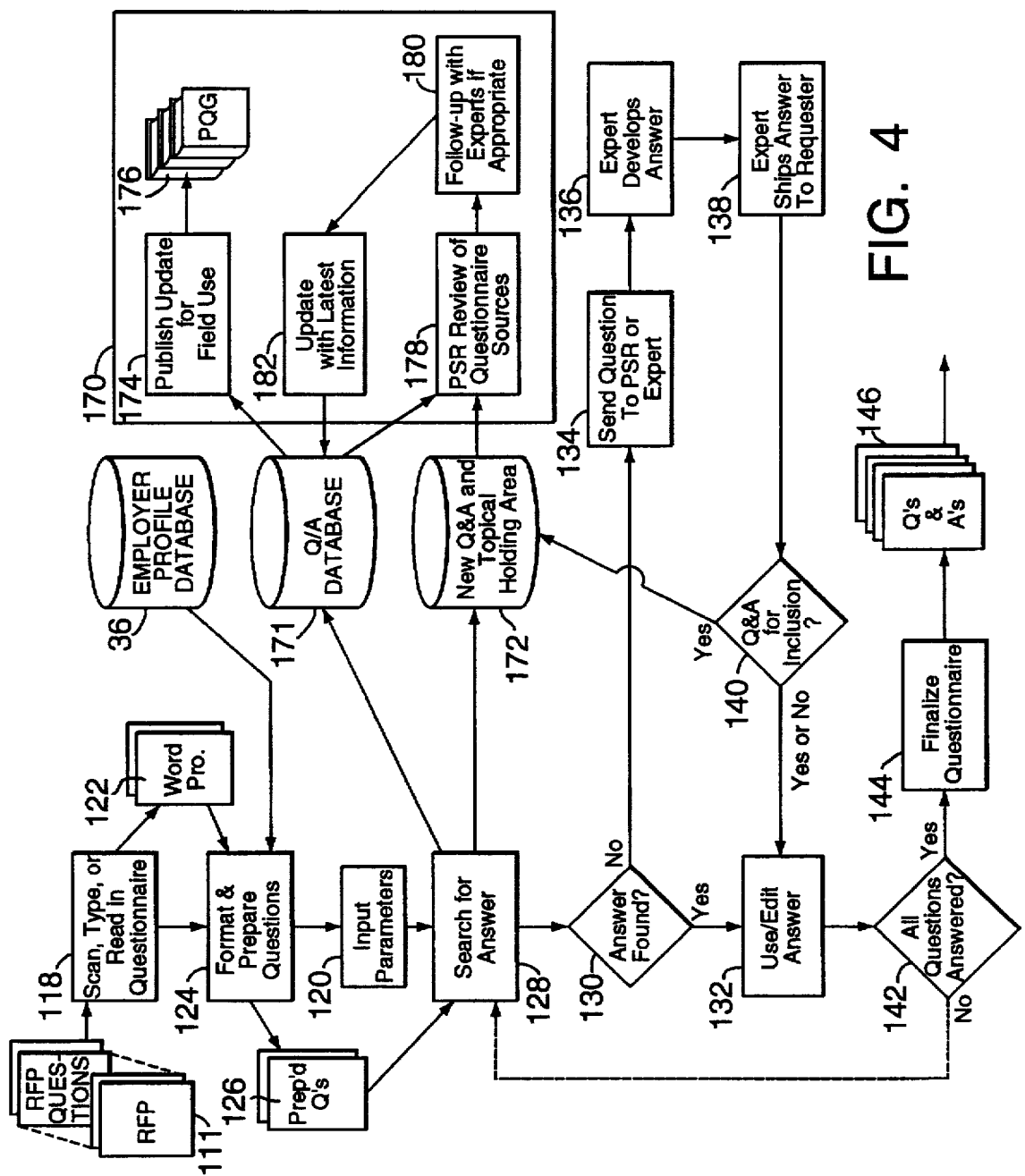
FIG. 4 is an enhanced diagrammatic illustration of a second portion of the system as illustrated in FIG. 3.

FIG. 4 is a more detailed schematic illustration of the process outlined with respect to FIG. 1 as carried out by the present system. The questions in the RFP questionnaire are entered in to the system either by scanning or typing into computer readable format (block 118). Input parameters are assigned at block 120, including "attributes" such as geographic site, market and size. The present system employs a conventional word processor program 122 which allows for the preparation and editing of the questions 124. The questions are formatted and edited as needed (block 126).

Thereafter, the system conducts a search (block 128) of the question and answer database. Should one or more possible answers be found (block 130), they are presented to the user for evaluation and editing (block 132). If no acceptable answers are found, the questions are sent by electronic mail or other equivalent means to a subject area expert for research (block 134). This individual or individuals will then develop the appropriate answer (block 136) and returns the same to the respondent or requester at block 138. The question and answer is evaluated for future inclusion in the question and answer data base (block 140) before the final editing process. Once all questions are answered (block 142), the questionnaire responses are finalized (block 144) and are presented for inclusion the response document (block 146).

Figure 5:
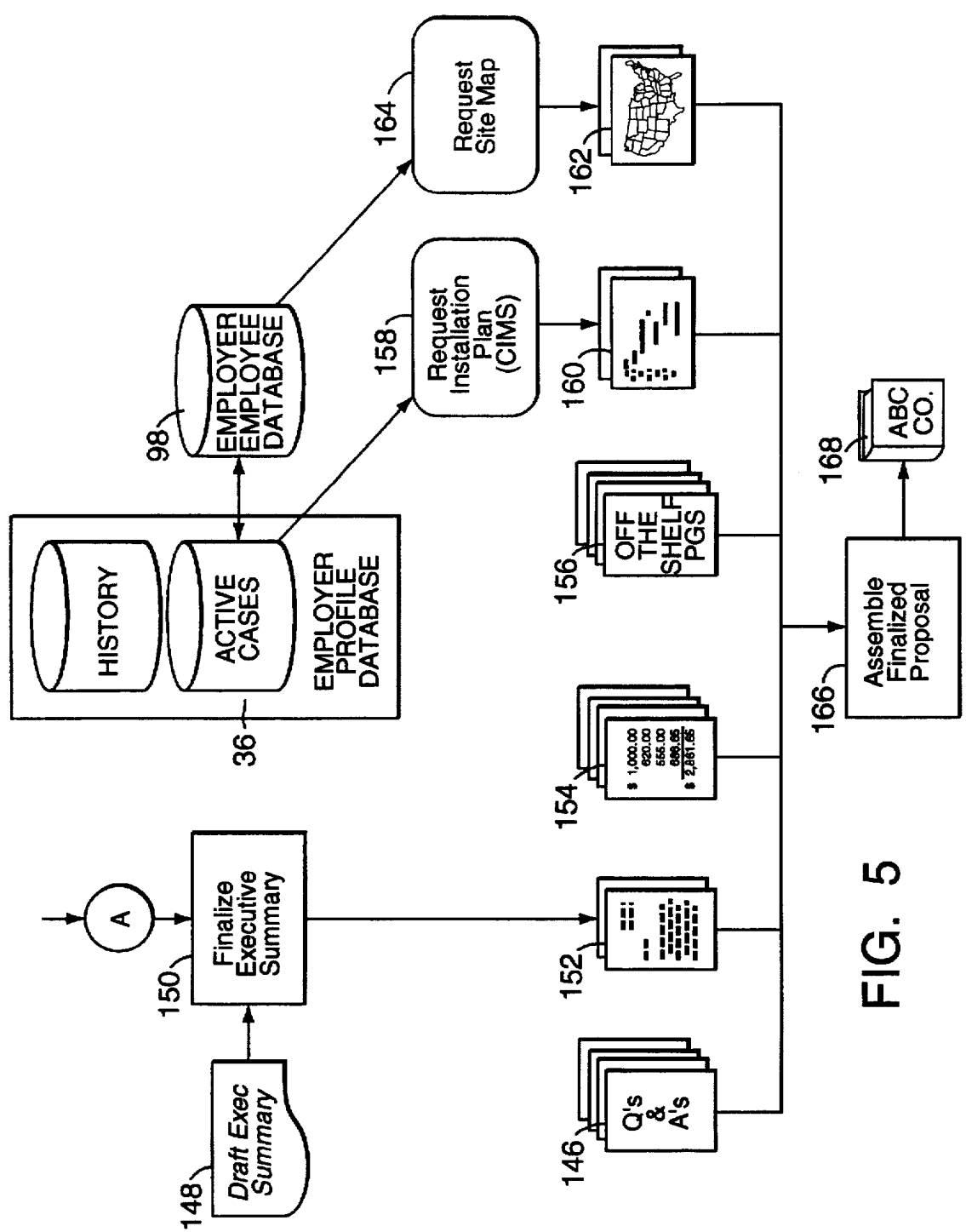
FIG. 5 is a more detailed schematic illustration of a portion of the process outlined with respect to FIG. 1 performed in addition to that shown in FIG. 4.

FIG. 5 is a more detailed schematic illustration of a portion of the process outlined with respect to FIG. 1 performed in addition to that shown in FIG. 4. A draft executive summary 148 is prepared and reviewed (block 150). This portion of the response document summarizes the overall content of the response, and is sometimes not included as the situation warrants.

The finished response document sent to the consultant is a composite of many components. The finalized questionnaire (146) is retrieved, together with the finalized executive summary 152. Financial information 154 and pre-prepared pages 156 are gathered as well. At block 158, an installation plan 160 (CIMS) is obtained from the employer profile data base, and a site map 162 is obtained (block 164). These components are combined by the respondent (166) into a finalized proposal (block 168) for presentation to the prospect.

One of the underlying assumptions that is made by the respondent is that the information in the several databases accessed during this process is accurate and up to date. To ensure the same, the databases must be maintained, indicated schematically at 170 in FIG. 4. The present system, as do other known systems, require question and answer databases 171 be maintained, and new questions and answers be added (block 172). In this regard, often those responsible for maintenance publish an update on regular intervals or as needed (block 174) for inclusion in a paper or electronic guide 176. Questionnaire sources are reviewed at block 178, and follow up inquiries, as needed, are made at block 180 with subject area experts so that the databases may be updated (block 182).

Figure 6:
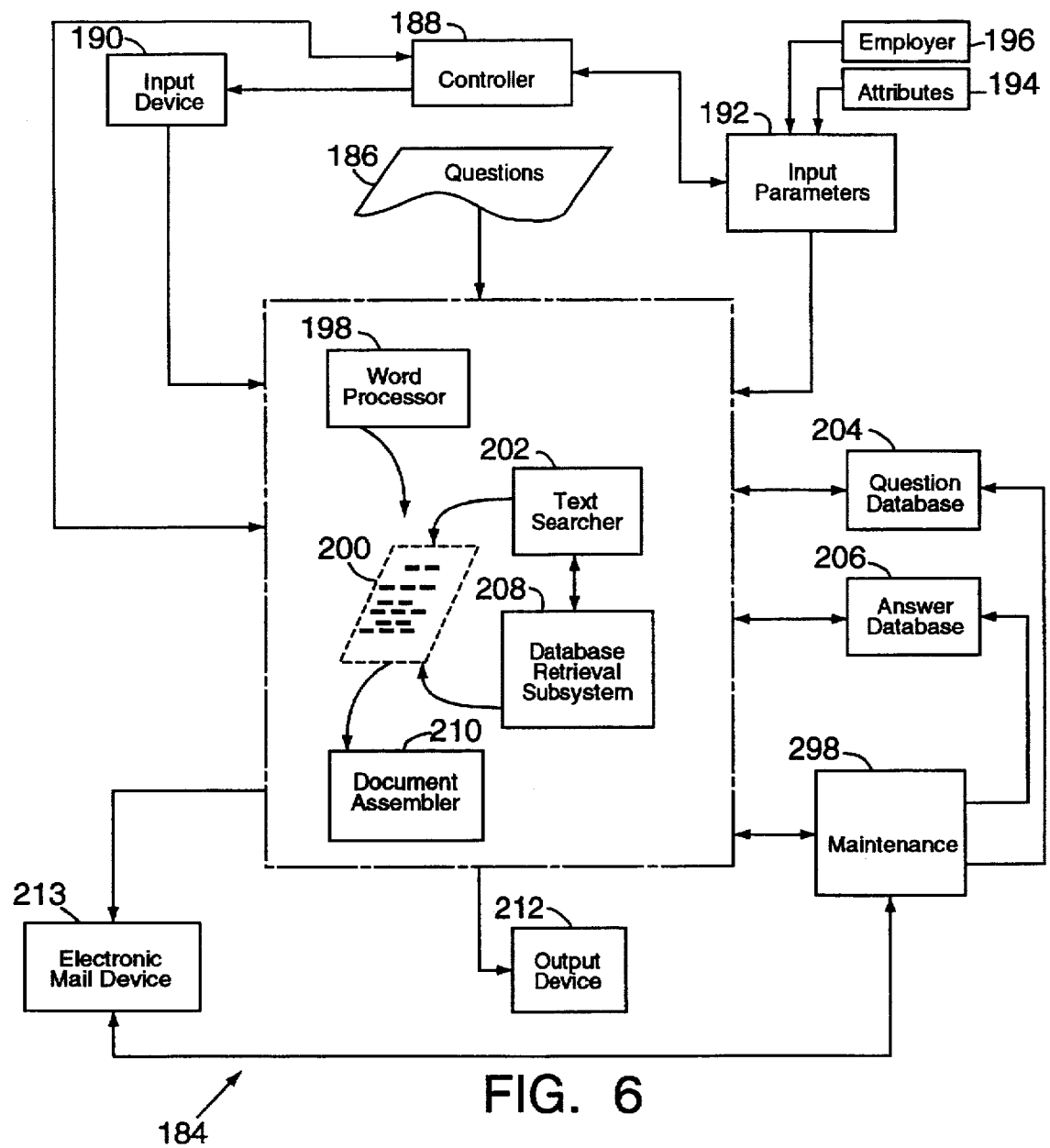
FIG. 6 is a simplified schematic illustration of a proposal response system as provided in accordance with the present invention.

FIG. 6 is a simplified schematic illustration of a portion of a response system 184 provided in accordance with the present invention. An RFP questionnaire 186 is typically received in printed form and must be scanned or otherwise electronically processed before input to the system. Commands signals from an operator are received by a system controller 188 via an input device 190, such as a personal computer. The controller is in communication with remote file servers and the like during this process. The respondent uses the input device and its associated display for receiving signals from system as well. Through the controller, the respondent can specify the requisite information which constitutes the input parameters for the process (block 192), including "attributes" 194 corresponding to product, financial arrangement, market, consultant and the like, as well as employer/group information 196. The preferred system utilizes a word processor program 198 of a known type to edit and store received questions as well as format them into a preferred configuration for further use by the system. The word processor also is configured to generate a response document 200 by means of a template which automatically places questions and answers in a standardized form without the need for direct input from the respondent.

Once the questions from the questionnaire have been initially processed, a searching apparatus 202 interrogates a question data base 204 to locate questions which match the subject question either exactly or to a degree selectable by the respondent. The preferred searching apparatus comprises a "Topic" brand search program sold by the Verity Corporation. In the system, questions are stored in the question data base and have associated therewith an answer or answers stored in answer database 206. The question and answer data base in the preferred embodiment resides on a file server operating in a "Novell" brand local area network (LAN). The file server is a central storage device which is accessible to respondents. One or more of the answers which are returned by the system in dependence on the combination of selectable input parameters as well as the text match between the subject question and those in the question database.

A data base retrieval apparatus or document manager 208 such as the product "Mezzanine" offered by the Saros corporation is used to control the retrieval of the question from the data base as well as updating any information associated therewith. A document assembly apparatus 210 is used in the preferred embodiment under the supervision of the system controller to assemble the array of the questions with each selected answer in the response document for final presentation to a printer or electronic output device 212. The present system also incorporates apparatus 213 for communicating with subject area experts by means of electronic mail.

Other technologies are utilized in or across the various subsystems as part of the present invention. These include Q+E brand database software for management of questions and answers within a case specific questionnaire and Visual Basic screen generation algorithms for screen processing. These tools are deeply embedded in the present system and are not visible to the end user. Those skilled in the art will note that the various software products have been incorporated in the present system by techniques known in the art. For example, developer versions of the searching and document management apparatus have been utilized with custom front end and interface software to create the present system. Similar utilization of other software engines allow for other functions performed by the present invention to be accomplished. Those skilled in the art will also note that the present invention allows for the substitution of other algorithms to perform the functions of the present system with appropriate modifications.

As noted, the document management subsystem provides for all of the following:

1. controlled access to documents (i.e., user access rights).
2. version control of documents (in the case of preferred embodiment, the most up-to-date and 2 prior versions of each questionnaire are maintained in Mezzanine).
3. updates/work-in-progress (or response documents under development) activity logs.
4. general purpose attributes (i.e., last update date, user name, etc.,) and up to 20 user defined attributes associated with each document in a database/data set (The preferred system makes use of all general purpose and user defined attributes; reference user manual for definition of each).

The document management subsystem is built into/utilized in all of the subsystems in the preferred embodiment except a standalone "Browse" function, as detailed herein. Documents used in the system and managed via the Mezzanine document manager are:

1. work in-progress and completed case specific questionnaires, to which end users have read/write access via the various subsystems. With each case specific questionnaire, there is a set of 8 documents for processing in the system by one or more of the subsystems, including several in text, word processing, database and table format.
2. Database questions and answers, each as a Microsoft Word formatted (i.e., margins, font styles, etc.,) document. End users or respondents have read only access to these documents; maintenance/updates to the database are processed/managed exclusively by the maintenance personnel to ensure accuracy, quality, and consistency of answers.

The Topic searching apparatus is a sophisticated text searching software. Beyond standard text retrieval search functions (i.e., key word, phrase, proximity, etc.,), it provides for attributes associated with text/documents and a rating/ranking order to search results, which is critical to the system. The questions, answers, and their qualifying attributes in Topic are duplicative of those used in the Mezzanine counterparts, however the Topic versions are not Word formatted documents (i.e., ASCII text versions). This was done for increased performance/response in system searching. Topic is built-in/utilized in the Interactive Search and Batch Search applications only. Word is used for all formatted document viewing and editing, and is built-in/utilized in all applications, Standalone Browse inclusive. The Windows Help feature is used for both Browse applications, i.e., Browse during the response document preparation and with Standalone Browse during maintenance, for access to the databases via a hierarchical subject index.

Figure 7:
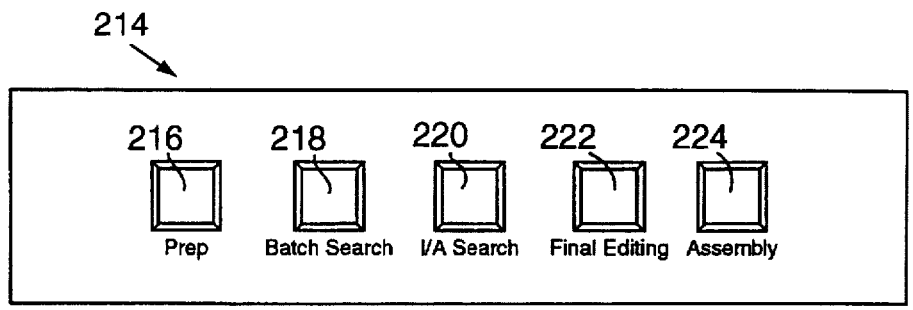
FIG. 7 is a simplified diagrammatic illustration of a display screen as provided by the present invention.

Referring now to FIG. 7, there is shown a simplified diagrammatic illustration of a display screen 214 as provided by the present invention. The preferred system includes apparatus for performing a plurality of functions which are selectable by the respondent. The system functions may be accessed by the respondent during different stages of the response process. The system is broken out into multiple applications to accommodate flexible workflows and shared accountabilities based on job function and/or end user levels of business knowledge and/or computer literacy. The following is a brief functional description of each application.

Initially, the respondent will access a subsystem 216 labeled "Prep" in the preferred embodiment which is used to prepare the questions so that the system can search for similar questions within the question database. In addition, this allows the respondent to set the response document form and correctly format the placement of answers. In the preferred embodiment, a Microsoft "Word" brand word processor is employed. A template document is constructed to configure the questions and answers with place holders which adhere to an established proposal formatting guideline.

The "Prep" subsystem is the mandatory pre-cursor to all subsequent system applications except stand alone system "Browse", as defined herein.

Basically, the purpose of the "Prep" subsystem is to provide several capabilities. One is to produce a plan-sponsor specific standard template for the completed questionnaire (i.e., landscape or portrait using standard fonts, styles, margins, etc.,) and supplement with questionnaire specific optional formatting features (i.e., custom labels, headers, etc.). Secondly, the respondent is enabled to enter basic information about the quote/proposal (i.e., plan sponsor, consultant, due date, etc.,) and catalog/archive the specific plan sponsor questionnaire. The respondent may also delineate questions as required for (subsequent) automated system searching.

Also accessed by the respondent is a "Batch Search" subsystem that executes an algorithm 218 to perform an initial search in the database of the selected questions in the questionnaire. Typically this is done by the system after hours. A questionnaire which has been deferred to the batch search algorithm will normally be available the next morning. The "Batch Search" algorithm provides for unattended questionnaire question matching against the question database, and is actually split into 2 different components.

The first component is available to the respondents and provides for assignment of attributes (i.e., question qualifiers such as product, financial arrangement, etc.,) according to the quote/case specifics. Attributes can be assigned for either the entire questionnaire, a section of the questionnaire, or one question at a time. Once attribute assignments are completed, the respondent would then queue the questionnaire up for a Batch Search. The second component is installed/available on one or some limited number of workstations. It's function is to initiate the actual batch search for all queued questionnaires. This is usually a designated responsibility for a more technically literate staff member. This searching component focuses on the questionnaire question text in combination with assigned question attributes, and attempts to match those to questions and attributes in the question database. In the case of an exact question match, the answer for that question will be pasted into the response document. The system will otherwise produce a list of "like" question matches for review in the Interactive Searching application. Completion of the "Prep" algorithm for a given questionnaire is a mandatory precursor to Batch Search execution.

As detailed hereinafter, questions in the questionnaire of the RFP are compared against the questions in the database. Exact or like matches are retrieved and displayed next to each questionnaire question. This is an optional function as the system may be operated interactively using the interactive algorithm 220 labeled "Quest" in the preferred embodiment. "Quest" is a trademark of the Assignee of the present invention to describe its system. The interactive algorithm performs the same review select and edit of the questions and the answers as does the batch search function, but does so in real time under the command of the respondent.

The respondent also may select a subsystem 222 for final editing of answers which were not available within the data base under any circumstances and must be input from external sources. As these answers are received by the system, they are inserted into the pre-formatted response document. There is also a subsystem 224 for assembling the documents which is used if the questionnaire was divided into separate subdocuments and distributed among several different respondents. This subsystem combines the sections into a single questionnaire.

A point of departure of the present invention over the prior art is the initialization or preparatory function performed by the present system. Prior art attempts at computerization of input text corresponding to the questions and performed a simple word search to locate character strings corresponding to the text or portions of the text. In contrast, the present invention performs several functions which allow each question to be identified, including parts and sub-parts.

Moreover, each question is associated with input parameters which are searched as well during the search process. As a result, the present system will not only identify like or similarly worded questions by text comparison, but also questions where specified attribute values are the same.

Figure 8:
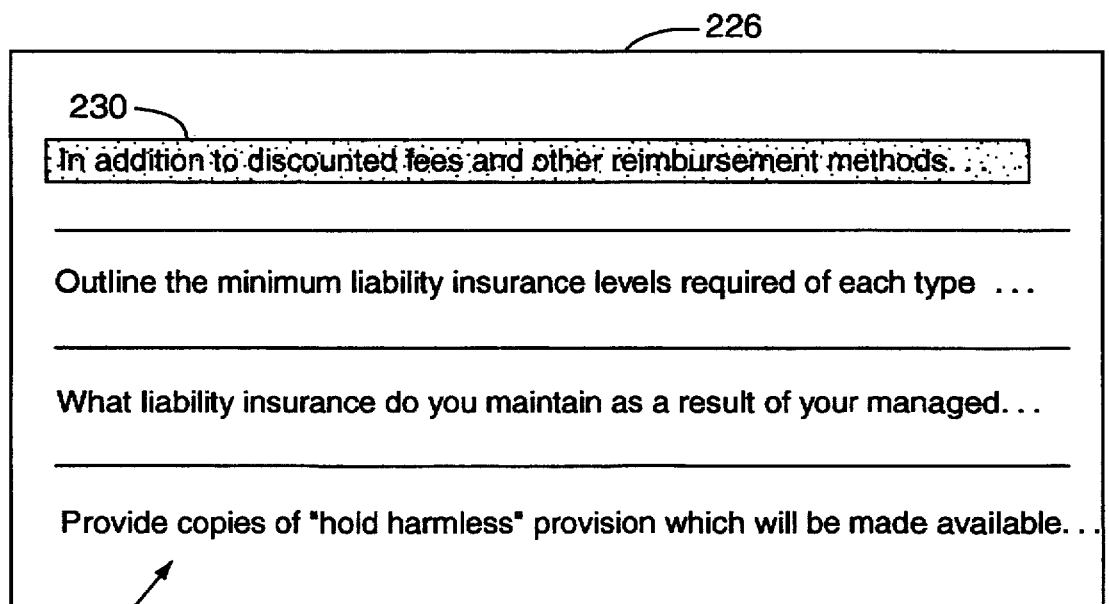
FIG. 8 is a simplified diagrammatic illustration of a display screen in addition to that of FIG. 7.

Once the questionnaire has been placed into electronic format either by scanning, typing, etc., the text that comprises individual questions must be edited to correct spelling and extraneous material removed. At the beginning of the process, a response document is created containing each question in the questionnaire identified by the respondent. The present invention also creates an associated database file which contains initial information of a bibliographic nature on the product, respondent, consultant, etc. The preparation apparatus of the present invention interacts with the respondent via a screen presented on the input device display. An example of the same is shown in FIG. 8. Screen 226 sets forth some of the text in the questionnaire. The respondent highlights or otherwise indicates the beginning and end of that portion of text 228 which comprises each question. In FIG. 8, text 230 has been selected by the respondent and corresponds to the first question in the questionnaire. After selection, the respondent assigns that text to a question number. Thereafter, the question will be placed in the response document at the corresponding question location.

Figure 9:
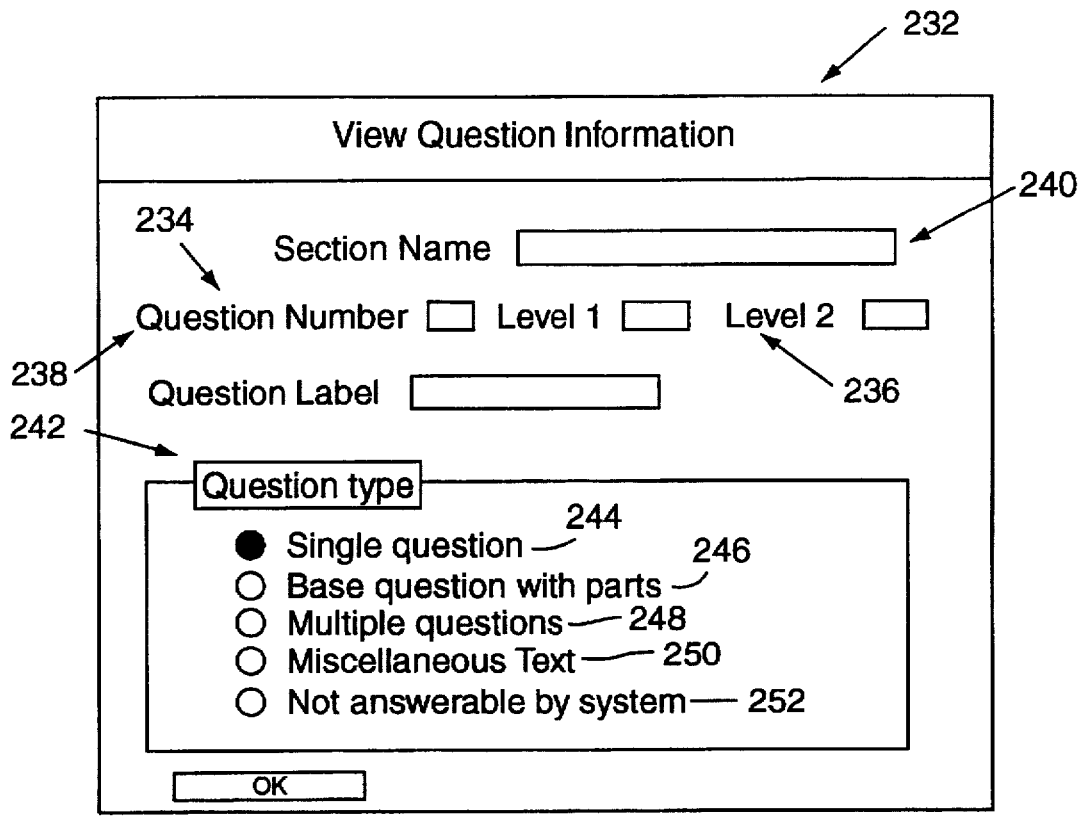
FIG. 9 is a simplified diagrammatic illustration of a dialog box presented to the respondent by the present invention.

Once the text is selected by the respondent and identified as a specific question, a dialog box is preferably displayed to the respondent and the user is required to fill in necessary information about a variety of input parameters and information on the particular question. FIG. 9 is a simplified diagrammatic illustration of a dialog box 232 presented to the respondent by the preferred system.

Question number 234, level 236 and question label 238 must be provided. The name of the response document section is given at box 240. In addition, the question type is identified at box 242. Questions may be of several types; a single question 244, a base question with parts 246, multiple questions 248, miscellaneous text 250 or identified as not answerable in the system (NAQ) 252.

The respondent has the ability to divide a questionnaire into many smaller blocks called sections and treat these blocks separately until each is finished.

This feature of the present invention is needed when more than one person must be used to answer a questionnaire. The respondent selects a new file in the word processor program and is then asked to open an existing questionnaire text provide the requested information and then "append" questions for the given section. This procedure can be repeated several times during the building process. For the present application, append is a process defined to include the addition of a "question" as set forth herein.

Each question has an identification number, associated attributes and other parameters in addition to the text of the question itself. At the beginning of the process, the respondent is presented with a text file which must have selected portions identified as individual "questions", the basic unit by which the present system operates. The respondent is preferably presented with a screen in which the text portion can be highlighted and assigned a configuration. The process is repeated until all of the questions have been selected.

Questions can, of course, be of several configurations. The simplest is the basic interrogatory, but other configurations are possible. There may be a base question with parts and even subparts, or the interrogatory can be of compound form. Those skilled in the art will note that the form of the question is a important consideration in determining the search conducted by the system. For example, with a base question with parts, the system can search for the base question alone or in combination with one or more parts. The system can also search parts alone or in combination with other parts/subparts. The analysis conducted by the system has a profound impact on the reliability, speed and overall performance of the system.

An important point of departure of the present invention over the prior art is the searching algorithms employed in identifying exact or similar matches for each question. Key to this process is the recognition that a question structure must be established to minimize redundant or incomplete searches. The present system will, as detailed hereinafter, search for a simple question in accordance with the text and associated attributes. Compound or multiple questions are searched by each separate interrogatory portion. A base question with parts is searched with each part coupled with the base interrogatory. So, for example, a question with three parts will yield three distinct searches. Inclusion of subparts increases the number of searches in accordance with their number.

In the preferred embodiment the system prompts the respondent for the question type, single, base with parts, or multiple (compound). If either multiple questions or a base question with parts has been selected, a second dialog box appears. The respondent is asked if the answers to the multiple questions should placed immediately following each question. This allows the respondents flexibility in deciding how they want the final document to appear. They can choose to insert the answer after each individual question, or to accumulate the various answers and insert them as a conglomeration after all of the multiple question parts.

If the question is a base with parts or a multiple question, another dialog box will ask whether the next question is part of the current question. If so, the question information dialog box is incremented appropriately. If not, the next question number will be incremented by the system. For situations where extraneous text is presented, the question type is categorized as miscellaneous text and will be excluded from any search conducted by the system. Examples of extraneous text which would otherwise cause confusion and unnecessary searching by the system are section headings which need to be preserved and questionnaire formats in the proposal.

For questions which require tables, standard exhibits or illustrations as an answer, the question is categorized as not answerable (NAQ). These questions will appear in the system with this particular status and will be included in any summarization of the questions. Questions given this designation will likewise not be searched by the system. The respondent is prompted immediately after the question type is designated as NAQ to further specify the type of question in the dialog box. Question formats which are nonanswerable can be, for example, a table or exhibit or an appendix. There are also situations where a question is site specific, customer specific or simply not loaded into the system. In the preferred embodiment, tables and the like are extracted from the document prior to formatting in word processor format in order to maintain the integrity of any column and/or row heading. The table can then be inserted into the response document during final editing, after completion of the searching process.

The respondent can renumber and hence reposition the question in the response document by manipulating the question numbers and text accordingly.

The system presents an insert question dialog box which inquires as to which question(s) to insert after the current question. If the first question in a question list is selected, the system asks the user if it is appropriate to insert the selected question first, since there is, in the preferred embodiment, no provision to insert before the first question in the list. Questions may be deleted by a delete function. Once a question is deleted, all of the information associated with the question is lost.

Figure 10:
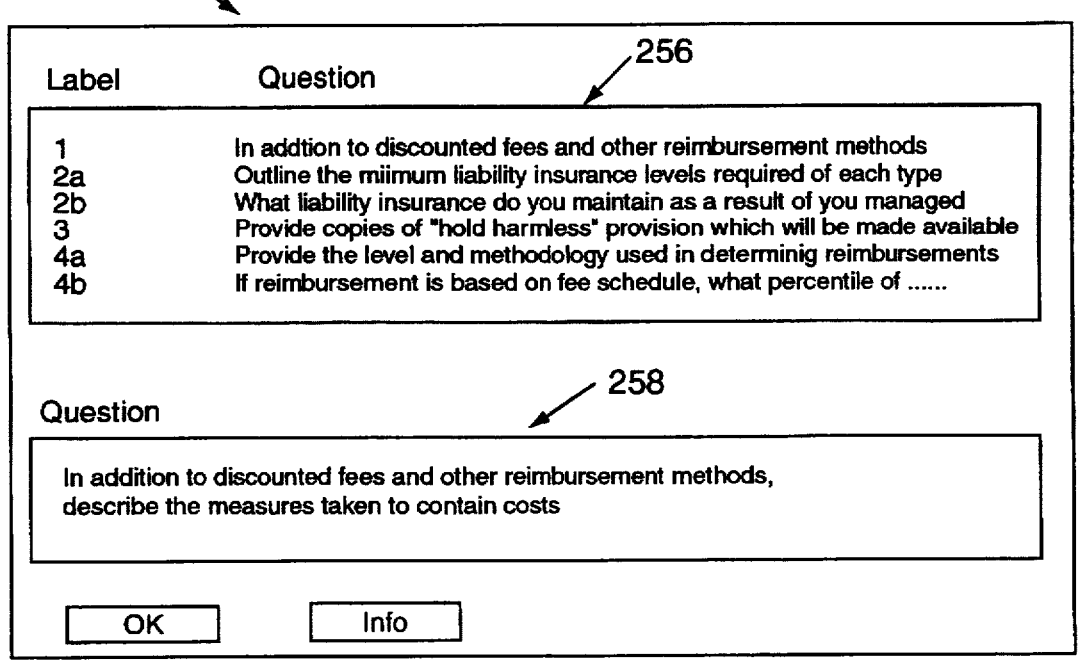
FIG. 10 is a simplified schematic illustration of a screen displayed to the respondent with a list of questions and question numbers.

The present invention enables the respondent to view the questions during this process by selecting a question summary function. FIG. 10 is a simplified schematic illustration of a screen 254 displayed to the respondent with a list of all the questions 256 as well as individually selected questions 258. By highlighting or otherwise indicating a line in the list, the individual question text is displayed in a subfield 258. A highlighted question or otherwise selected question from the list can then be further interrogated to obtain information on the specific question display.

To modify question information such as text, number, levels, label or type, the respondent deletes the original question and inserts a new question with the correct information. Once the questionnaire has been fully or partially prepared, the respondent saves the questions with the appropriate formats and formatting characteristics. An update is made by the system in the text (response document), database and questionnaire files as well. Moreover, the present system contemplates circumstances where an entire questionnaire will not be completed in a single session, and allows the respondent to exit the session and return. When subsequently accessed, the system will return to the question last addressed. After all of the questions have been identified, the respondent enables a "Build Questionnaire" function. At this point in time, the system begins an initial assembly process of the response document ultimately presented to the prospect.

During the assembly process, the system reads each question from the received questionnaire and constructs a formatted word processing document containing all of the subject questions with place holders for each answer. The respondent saves both a questionnaire "shell" document which stores the scanned questionnaire text file containing the subject questions and a "shell" of the formatted response document by means of a document handling apparatus that, in the preferred embodiment, comprises a Mezzanine brand program. If the respondent declines to proceed with this process, any questions that have been added, inserted, deleted will be lost, and no formatted document shell will be saved.

One of the capabilities provided by the present system is the ability to search in a batch mode. Batch processing significantly increases the throughput of the system and the appropriateness of system responses. Moreover, it reduces the amount of time spent on the part of the respondent or sales consultant who would otherwise interactively search for responses. Achieving the desired benefits is largely dependent on the thoroughness and accuracy of the data maintained in the question database.

The batch search apparatus is selected by the respondent. The system presents a list of received questionnaires that have completed the preparation process. The respondent selects a questionnaire from a list of those that have completed the preparation process. Prior to initiating the actual Batch Search process, the respondent must assign input parameters, such as the "attributes", to each question. To do so, a question or group of questions from the screen are selected. The system then presents a screen similar to that shown in FIG. 11.

Illustrated in the figure is a screen 260. In field 262, basic input parameters for the subject question are presented, including category, consultant, SME and the like.

The system will present a list of consultants which have been preprogrammed.

Field 264 presents a series of pick lists with alternatives for attributes such as coverage, product, financial and geographic site. Life AD&D, GUL, TDI, LTD, Medical and Dental are examples of possible coverage, while indemnity, managed indemnity, PPO, POS with risk sharing, POS without risk sharing are examples of product. Conventional, prospective, SFGP funded, SFGP unfunded are, possible financial arrangement attributes. Field 266 allows the respondent to attach comments to the question for use during subsequent stages of the process or for historical purposes.

The present system assigns default values to some attributes, as appropriate. Parameters such as market size and consultant will be set to the default value by the system unless changed by the respondent, as will the MOD vendor. Certain attributes like coverage, product, financial arrangement and geographic site can be assigned multiple values, while consultant, MOD vendor and market size are limited to one. For example, POS with risk sharing, POS without risk sharing or PPO can be simultaneously selected as products. As a result, the list of sites which will become enabled with other is restricted. Since not all of the attributes are independent of one another, selection of one or more different attribute values will automatically enable/disable values of attributes subsequently selected. For example, the site list will reflect HMO sites if HMO or, equivalently EPO, are selected in the product list. The present system provides for the generation of an error message to the respondent if any of the attributes are not assigned at least one value. Information on the question is displayed for the respondent to review and/or change. The respondent modifies the question attribute value in a known matter such as by highlighting a question from the question list (256, FIG. 10) and clicking "edit" or its equivalent from the attribute menu. The edit function is disabled when more than one question is highlighted in the list or the question highlighted has no attributes assigned at this point in time. As with the assignment of attributes, coverage, product, financial and site can be assigned multiple values;

while consultant, MOD vendor and market size are limited to one. If a second value is "applied" to one of these attributes, an error message indicates that "this attribute can only be assigned one value". The "next" and "previous" buttons set forth in the dialog box allow the respondent to review each set of defaulted attributes and edit if necessary.

The respondent then launches the actual Batch Search process.

However, prior to initiating the search, the system prompts the respondent to view questions which have not been assigned attributes at the time of session. After verifying that all questions have been assigned attributes, the respondent can choose to proceed with submitting the questionnaire shell for the batch search process. The present system also anticipates that each and every subject question will not be verified and the assignment of attributes completed in one session. Therefore, it allows for interrupted sessions as well as for the editing and reassignment of attribute's values after they have been made.

The searching apparatus with the present invention conducts a word search of the question database and a further search of attributes. The system will return questions which have several different levels of matching quality. The most precise match corresponds one in which all of the attributes and parameters match with the subject question as well as an exact match of the text and the number of words in the subject question and the question in the database. For example if the subject question is:

"what eligibility information do you maintain on each participant in your claim system?"

an exact match would be the identical question worded with exactly the same number of words in the same order. In the absence of an exact match, the system will return the following questions as a "like" match:

"what eligibility information do you maintain on each participant in your claim system? in your enrollment system?"

Similarly, the system will return a question as a like match in which the wording is up to 75% identical to that in the subject question, exclusive of additional words where all of the attributes and input parameters assigned to the subject question match exactly with that database question. The system has several other combinations which also are also considered a match. For example, in the situation where all the text in the subject question is identical with a question in the database and the number of words in the question is equal to the number of words in the database question and, finally, if at least one of the attribute values or input parameters assigned to the subject question match at least one of the attributes of the database question, the system will return that question as a like match. The system can also be programmed to accept other combinations of text identity and attribute match. The preferred method of searching the question database is first by character string in the questions to identify those questions, if any, which have any exact match and thereafter to search the input parameter or attribute values to ascertain the level of match.

The present invention identifies those database questions which contain additional language to that set forth in the subject question. It does so by verifying the question word count. Should a database question have precisely the same number of words as the subject question, this situation is recorded initially as an exact match. However, if the number of words in the subject and database question is not equal, the results are saved as a "like match" to a table containing similar questions. In the preferred embodiment there is a plurality of tables which contains the results of the search, including those situations where the identity of attribute values varies. The answer text associated with the each question identified as either a like match or an exact match is saved in order from greatest match to least match, including the word count, question content and the attribute/input parameter equivalency.

In addition to the batch mode, the present invention provides for an interactive mode in which the respondent can search the question database. This subsystem is presented to the respondent at icon 220 in FIG. 7. Though not mandatory, it is recommended that a Batch Search be run on a questionnaire prior to entering the interactive mode. Should a user begin answering questions in the Interactive mode and subsequently execute a Batch Search, all of the work done in by the interactive subsystem will be lost in the preferred embodiment. The only mandatory pre-cursor to executing this subsystem is the execution of the Prep algorithm detailed above.

All of the Batch Search methods are available in this subsystem but are accessed only one question at a time. There are additional end user specified text, attribute, or text and attributes combined search capabilities as well as the ability to "Browse" through the database via a subject index, should text search methods provided prove too resource intensive. The user can also interactively search on answer text, whereas Batch Searching applies to question text only. Also included in the interactive subsystem is a "set question status/referral" feature, which allows for sending questions and answers to a Subject Matter Expert (SME) for a response, and flagging new questions and answers for the database maintenance personnel for review. Use of this feature is critical to keeping the database up-to-date.

The preferred embodiment incorporates algorithms that allow the respondent to interrogate the databases directly in dynamic manner, referred to as "Browse". There are two versions of the Browse application incorporated in the preferred embodiment which, from a respondent perspective, are duplicative of each other. However, they are slightly different from one another technologically speaking in that one can only function when the interactive subsystems are invoked, while the other, referred to as "Standalone Browse", is available in other modes such as during maintenance operations when a specific questionnaire response is not being prepared. The Browse subsystem consists of an on-line manual of database questions and answers, which are accessed via a hierarchical subject index.

Figure 12:
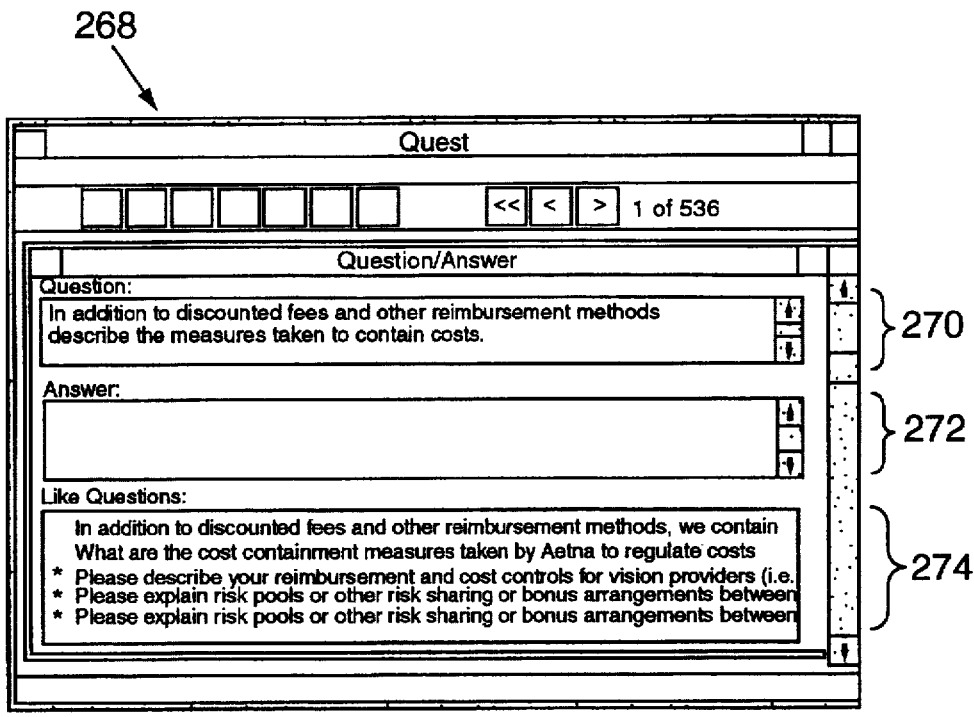
FIG. 12 is a simplified schematic illustration of a screen displayed to the respondent showing a subject question and questions which are a match therewith.

The system interacts with the respondent in a screen 268 which is comprised of three parts as shown in FIG. 12. At the top of the screen there is a field 270 which contains the subject question. An answer field 272 follows which will contain the selected answer. At the bottom of the screen is a field 274 indicating the question that is an exact match, or more typically, questions which have been identified by the system as a like match during the search. The respondent can scroll through the list of questions in a known manner. Once a question has been selected for review by the respondent, the associated answer is retrieved from the answer database and appears in the answer field.

Figure 13:
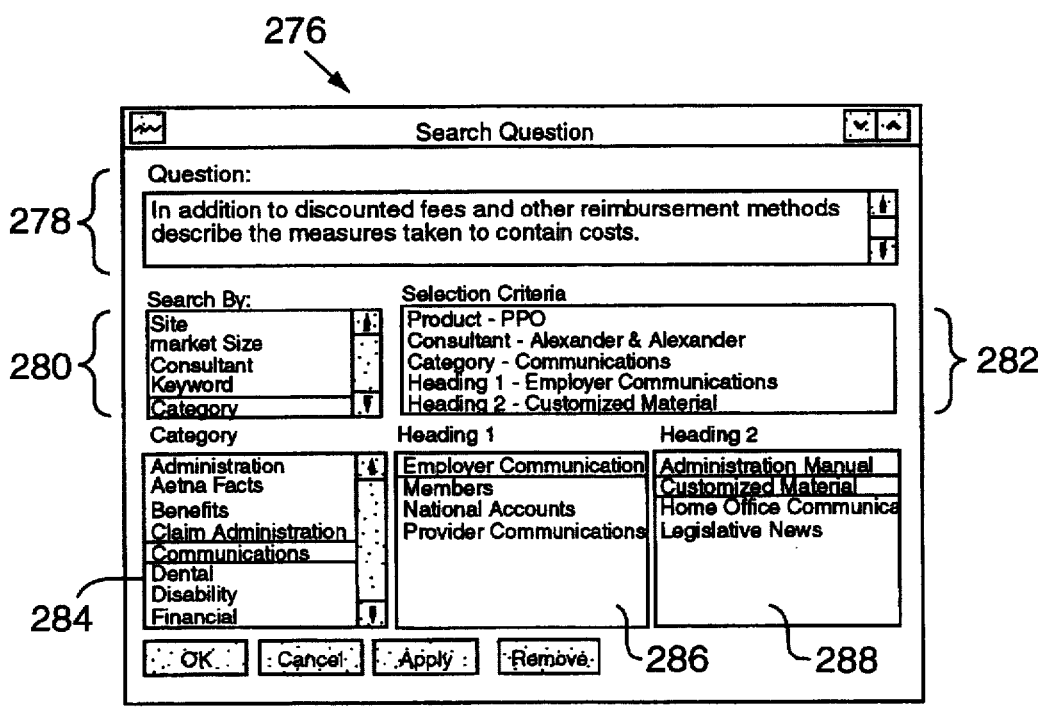
FIG. 13 is a simplified schematic illustration of a screen displayed to the respondent that shows selected search parameters.

Moreover, the present invention contemplates the typical situation where none of the questions which have been returned during the question batch search are appropriate. Accordingly, the present invention allows the respondent to search either the question or answer databases directly and to search by a combination of input parameters rather than the above described text/attribute combination. Once selected the system will interrogate the database for questions or answers which have the same attribute combination as selected. Those skilled in the art will note that the more attributes and input parameters selected as selection criteria, the more narrow the search; thereby increasingly limiting the possible returned questions and/or answers. In searching the question database, the respondent can select a screen in which the subject question is highlighted and the search criteria of parameters is selected. FIG. 13 is a schematic illustration of a screen 276. Field 278 contains the subject question. Fields 280 and 282 respectively contain selected attributes and selection criteria. Fields 284-288 contain category and headings one and two, respectively. In this manner, questions with dissimilar wording but with highly overlapping attributes can be identified as being appropriate for use with the current questionnaire while skipping the question search mode of operation completely. Similarly, the present invention allows the answer database to be interrogated directly in a manner similar to that described above. This is an important point of departure of the present invention over the prior art as it is probable that a single answer will be useful in with a variety of questions. The capability of the present invention allows for direct Access of the answer database and a quicker location of the correct answer in certain situations. Moreover, the present system allows the respondent to browse through either the question or answer database to identify either an appropriate question or an appropriate answer.

Figures 11, 14:
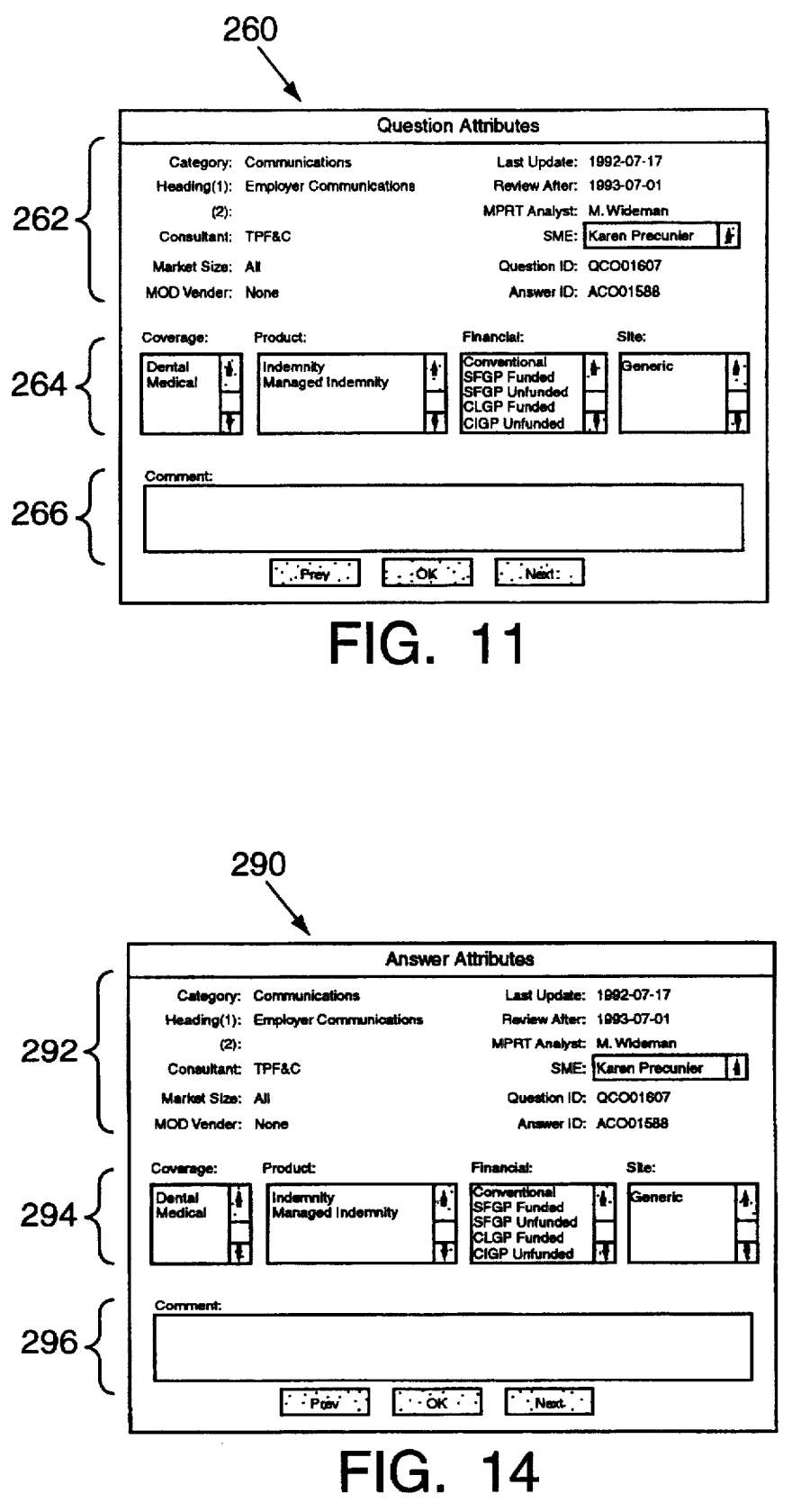

To aid in evaluation of the questions and corresponding answer(s) found by the present system, the respondent can view the attributes attached to a question and those of an answer via two screens, one for the question attributes and the other for answer attributes. The screen presented at this point of the process is the same as shown in FIG. 11. FIG. 14 presents a complementary screen 290. In field 292, basic input parameters for the returned answer are presented. Field 294 presents a series of lists with selected attributes. Field 296 allows the maintenance personnel to attach key information and qualifying comments about the answer for use during subsequent stages of the process or for historical purposes.

In those situations where the search process has not yielded an appropriate question/answer or answer directly by any avenue of search, the question can be referred to a subject matter expert. Moreover, in the preferred embodiment the respondent can select an individual subject matter expert who is to receive a copy of the document directly via a conventional correspondence or by electronic mail system (213, FIG. 6). In addition, the present invention allows the respondent to append additional text such as the date that the response is due to enable the subject matter expert to directly develop an answer without undue delay.

If the respondent determines that a given answer is appropriate for the subject question of the current questionnaire, the respondent indicates the same to the system by enabling "use" function which copies the answer to the appropriate location in the response document. In doing so, the status of the question is changed from "like" or "no match" to "pending". When the question must be referred, the respondent is presented with a dialog box whereby the subject question is copied to a clipboard within the system and the status of the question is changed from "like" or "no match" to "referred".

The present system counterplates nine values of status that the respondent can assign to an individual question. They are:

(1) closed- a question and answer were found in the database;

(2) send new question- an answer was found but the exact question was not found in the database and has been forwarded to database maintenance;

(3) send new answer -a question and answer were found with other attributes and new answer has been forwarded to database maintenance;

(4) send new Q/A pair- neither question or answer were not found in the database and have been forwarded to the database maintenance;

(5) send revised answer- an answer was found that needs modifications and has been forwarded to the database maintenance;

(6) send revised attributes- an answer was found that needs modification to its attributes and has been forwarded to database maintenance;

(7) pending- question for which an answer has been "used" but has not yet been closed;

(8) referred- a question that was referred to an subject matter expert for answering;

(9) NAQ- a question that is prospect or site specific or requires a table, standard exhibit or illustration as an answer.

There are five statuses that the system assigns to a question automatically.

open- the default for question with no searching or editing actions;

exact match- an exact match was found during the search like match- one or more like matches were found during the search;

no match- no exact or like matches were found during the search;

pending- searching or development of an answer has commenced;

referred- question has been referred to an SME using the system's referral function.

The present system allows for the inclusion of the respondent's notes.

These notes are attached to the scanned questionnaire and will be retained by the system for modification, review or further deletion during the present process.

Other features provided for by the present system include the ability to duplicate the scanned questionnaire for multiple plans, the ability to revisit the response document after it has been edited.

One deficiency of the prior art which has been overcome by the present invention lies in the assembly of the response document. In the past, the individual respondents would prepare a response to the questionnaire which would be manually entered onto a word processor or the equivalent before review and final distribution. However, with the present invention in the Final Editing apparatus there is a standardized template prepared by the document assembler which is constructed by the organization responsible for the system. Because document editing and formatting in prior applications is limited, the "Final Edit" apparatus provides a pure word processor editing environment, while securing the actual response document in a questionnaire database for control reasons including limited Access, automated backup, maintenance of versions, and overall system reference. The individual questions are inserted by the system in the proper order and location automatically, without the need for the respondent to do the same manually. When the corresponding answers have been identified, the system pastes the same in a reserved space in the response document. This feature yields a considerable savings in time needed to prepare the response document. Moreover, all of the response documents now have a standardized format which can be changed without input on part of the respondent.

The Assembly apparatus allows for combining multiple questionnaires and/or questionnaire sections into a single document. This is a useful tool if the original questionnaire was split into multiple documents with different people working on different sections due to size or complexity in the early phases of the questionnaire response life cycle. For those questionnaires which have been divided in sections so that several respondents can work independently to generate the response document, in the Assembly apparatus, the system will insert the questions and answers as above, and then assemble each of the sections together to create the final assemble document upon instruction. The present invention allows the editing of the sections before and after assembly into the response document.

In an other departure of the present invention over the prior art, the present invention has an apparatus (298, FIG. 6) which provides for maintenance of the question and answer databases. As noted above, the questions themselves are dynamic and their respective relationships to associated answers continue to change and evolve. One of the functions of the apparatus 298 is to ensure that the questions and answers stored therein are current as well as are applicable the proper products offered by the insurance company. The maintenance apparatus allows the controller to add and maintain questions and related answers through the use of document management software as well as searching routines such as are respectively found in Mezzanine and Topic software. Moreover, the maintenance apparatus allows the respondents, through the system controller, to track the status of the systems activities and maintain versions as the response document develops.

FIG. 15 is a simplified schematic illustration 300 of several of the processes executed by the maintenance apparatus of the preferred embodiment. As noted above, the respondent gives each question and answer one of nine statuses during the questionnaire response process outlined hereinabove (block 302). The question and answer databases (block 304) contain all of the files needed for this process.

The maintenance apparatus executes an auto link algorithm (block 306) in a periodic matter preferably twice a week. This algorithm gathers all the questions and answers with a certain status and loads a database management software device, preferably an Access brand database 308 offered by Microsoft with the question and answer information for the maintenance apparatus to be presented to the maintenance personnel. The status data is stored in a separate reference table.

The Access database includes a table which stores information on the questions and answers that are currently being processed by subject matter experts and others responsible for generating questions and answers for storage on the databases. There is also an algorithm executed by the maintenance apparatus which displays to a maintenance personnel which questions are being under review and the individual responsible for that process.

Maintenance personnel control the execution of the algorithm associated with the maintenance apparatus. The maintenance apparatus receives input from the Access database as well as the databases indicated in FIG. 6. In operation, the maintenance apparatus retrieves the questions and answers, name, status, action and author and provides them for a maintenance personnel to view on a display screen. That individual can then select a question or answer. The apparatus interrogates the appropriate database and, when found, the document management apparatus provides a copy of a document with the retrieved text to a temporary directory. Thereafter, the copy document is opened using a word processor shown at block 310. Text from the copy document is retrieved and loaded into an appropriate location in the maintenance program. Once identified as a question, for example, an appropriate answer is retrieved from the answer database.

If the text corresponds to an answer, all of the associated questions are to be retrieved from the question database. The maintenance apparatus then accomplishes the same by instructing the searching apparatus to retrieve the text for the associated questions or answer inputs the text into another text box on a screen presented to the maintenance personnel. If the question is to be edited, the individual performing the maintenance does the same using the word processor with the loaded document. After all the edits are made, the maintenance application saves and closes the document and has the appropriate document information provided to the document manager with the status field set to UPDATE.

Similarly, if the maintenance personnel desires to update the attributes of the question or answer, then the maintenance apparatus retrieves the same from the appropriate database and presents them on the display. After the attributes are updated, all of the attributes are written back to the document manager which stores the same as "protected" and/or "unprotected" items. A protected item has a word processor file associated with it that contains the actual text for the question and/or answer. An unprotected item does not have an associated word processor file. If the question or answer is new (does not occur in either database as of yet), then its respective attributes are written to a protected item. When the question or answer has its attributes updated, they are correspondingly written back to the protected item. If the question or answer has been revised (already present in the appropriate database) a different process is executed. An unprotected item is first created with all of the updated attributes are stored in the unprotected item. The status field associated with the unprotected item is set to UPDATE ATTRIBUTE. If the question/answer has text change the status field is set to UPDATE BOTH.

The reason the present system creates an unprotected item is so that the maintenance personnel can submit the question or answer to NO ACTION. If this status is selected, the individual does not want any of the changed attributes to be updated. If the question or answer is new, then the status would then be set to DELETE. If it is revised, then the unprotected item is deleted and the status is set to ACTIVE. When the maintenance individual is finished editing the question/answer, it is submitted to the appropriate database and a proposal number field with the protected item is marked SAVE. This parameter informs an update program that, when processing, the question or answer should be classified as one that has been changed and should be updated.

Also associated with the maintenance apparatus is a device 312 which acts to receive electronic mail including questionnaires and questions and answers from the sales consultants and respondents. The maintenance individual can open the word processing software with the questionnaire and select the appropriate text for each question or answer or question and answer pair. The text is then copied to its own document given a name and correlated with the document management apparatus. Thereafter, the question/answer can be assigned to a specific one of the maintenance personnel. A record is also created in the Access database. The author field is assigned the name of the maintenance individual the action field is set to new and the current status field is set to initial review. Should a question and answer pair be provided in this matter, the answer identification is assigned to the answer field.

Also included with the maintenance apparatus is a device 314 enabling a report generated in a pro-active manner to monitor all the questions and answers that have been set to a subject matter expert with a set expiration date. This allows the database to be continually updated in a proactive manner. The maintenance individual executes this report by selecting the pro-active referral report option off of the reports menu in the corresponding screen. This apparatus queries the appropriate databases according to the dates and subject matter experts named. The document manager returns the subject matter expert information. The apparatus then examines each record so returned and writes the corresponding information into a text file. Also a record is created in the Access database and replaces pro-active in the author field so that the maintenance apparatus can determine that is a pro-active SME record. When all the records initially returned are processed, the apparatus executes a word processing algorithm that creates a report in word processor document format. Thereafter, the maintenance individual can execute an algorithm associated with the maintenance apparatus and assign the pro-active questions and answers to other maintenance personnel (block 315).

A maintenance person can also submit a question or answer to a legal or subject matter expert interactively (block 316). For legal review, this is accomplished by selecting Submit to Database from a menu. The apparatus will respond with a prompt querying the user if submitting for legal review first is desired. The user responds accordingly. For SME review, this is accomplished by selecting a SME option provided with a submit menu. The maintenance person is allowed to select the SME as well as other pertinent information. Thereafter, for both legal and SEM reviews, the maintenance apparatus creates a text file that is stored in a directory associated with that maintenance person. Should there be a reference file already in place for that individual the system adds a new line to the file containing the associate information for each subject matter expert that was selected for the question and answer. The individual can then execute a daily legal or subject matter expert report which opens the reference file and reads each record.

The maintenance application creates a report in word processor format for each legal or subject matter expert that is listed in the reference file. When all of the reports are completed, the maintenance individual can print each report and send a copy of the same to a particular legal or subject matter expert. Interactive maintenance is generally done to validate new or significantly revised answers.

The document management apparatus is preferably in a known computer server form (block 318) that is associated with the question and answer databases. The document management server keeps track of all questions and answers which are stored. For security reasons, maintenance personnel are, in some embodiments, unable to view documents on the document management server directly. The document manager may comprise several other servers which are configured as needed. Similarly, the searching apparatus may also employ a database which, in the preferred embodiment, is stored on a Novell brand server 320 and is used by the maintenance apparatus to perform text searches for the maintenance personnel. This database does not get updated by the maintenance apparatus as described above, but rather is updated periodically.

There is also a periodic upload algorithm executed by the present maintenance apparatus. Typically, this is done on a weekly basis and is used to update certain searching apparatus and document manager databases. The periodic upload algorithm is preferably a batch process which is executed once a week which performs several functions. One function is to process all of the questions/answers that have been updated by the document manager during the week. Questions or answers that need updating have a status of updated document, updated attribute, updated both, delete or new. Secondly, the algorithm rebuilds the searching apparatus database. Lastly, this algorithm builds a file which is used in the "Browse" algorithm detailed above.

The periodic upload algorithm is executed from a workstation which has Access to the system servers. When rebuilding databases, the application initially processes the records in the Access database. The first step is to process all of the questions/answers that have been submitted for legal review. The records for these questions and answers are stored in an associated legal review table. When a question or answer has been returned from legal review, it is moved from one table, the legal review table, to a separate table for reporting purposes. A question or answer can be moved from this table in two ways, first the user can open the question or answer using the maintenance apparatus and set the corresponding status to "submit" or "initial update", if significant changes are necessary. Secondly, if the question or answer has been placed in the legal review table for more than a certain period, seven days for example, then the question and answer is automatically submitted to the database and has it status and the process table set to "submit" and the record is moved accordingly, When all of the legal review records have been processed, the records in the maintenance process table are next processed. This table is the main table that stores the questions/answers information that the maintenance apparatus uses to create its screen presentation for the user. The periodic upload algorithm updates the questions and answers. Those with a status of update documents, update attributes, update both, new or delete in those with an "S" in the proposal number field are processed. The servers are queried for these attributes and the questions and answers that it receives from the query are stored The periodic upload algorithm reads each record so returned to obtain name item ID and status. Questions or answers with update document status have their text updated. The algorithm rebuilds the word processing document and saves the same. Next the searching apparatus text file is rebuilt with the correct partition as necessary in the server. Status is then changed accordingly. A status change tells the maintenance apparatus that the question or answer has been built on the maintenance server and will have to be moved to another server if that embodiment of the present invention requires the same.

When updating the attributes for existing questions, an unprotected item is associated with that question or answer's protected item in the database. New attributes are stored in the unprotected item, the algorithm copies all of the attributes from the unprotected item to the protected item, a correct partition is obtained as needed and the searching apparatus index text file is rebuilt. Similarly, the above procedures are followed if both attributes and text need to be updated.

Also with new questions or answers, the attributes and text are added to the database directly. Other questions or answers which are to be deleted are done so accordingly.

The searching apparatus database is built on a periodic basis preferably once a week.

Once all of the searching apparatus data files have been rebuilt, the apparatus copies all of the rebuilt files to a maintenance specific storage volume. Thereafter these files are copied in a batch mode. The system only copies those files that have been created after a certain date that is specified before execution. Other copies of the searching apparatus files are created as needed in a wide area or local area networks which are accessed by the various respondents and maintenance personnel.

Another function provided by the periodic upload algorithm is to rebuild the files associated with Browse function.

The present system also contemplates other apparatus and algorithms executed by other maintenance subsystems that are used to allow systems set in locations remote from the home office to be accessed and updated in an orderly manner. The configuration of algorithms and apparatus needed to accomplish the same will be a function of the specific applications as well as hardware and software that are employed. For example, there will be algorithms which are used to initialize the directory structures of the remote server as well as other programs which control the check out and check in of documents from the local document manager and the correct updating of questions and answers.

Similarly, although the invention has been shown and described with respect to a preferred embodiment thereof, it will be understood by those skilled in the art that various changes, omissions and additions thereto maybe made therein without departing from the spirit and scope of the present invention.

We claim:

1. A method for generating a response document prepared in reply to a request for product information, said request including a plurality of questions, the method comprising the steps of:

receiving signals indicative of the questions in a text form;

formatting said question text signals into a corresponding plurality of individual questions;

assigning each of said individual formatted question signals identifier signals;

associating with said formatted question signals, signals indicative of values of associated input parameters;

searching a database having stored therein signals corresponding to a plurality of stored questions, each of said stored questions having associated therewith input parameter signals, said stored questions further being associated with signals corresponding to at least one answer stored on an answer database;

returning signals corresponding to a one of said stored questions having text or input parameter signal values that matches a one of said subject question text or said corresponding input parameter signal values;

selecting one of said stored answer signal values associated with said returned question;

associating each of said subject question signal values with the corresponding one of said selected answer signal values;

assembling said response document so that each of said subject questions and said corresponding answers are located in proximity with one another; and outputting said response document.

2. The method of claim 1 further comprising the steps of:

assigning each of said input parameters and said subject question text a weighting signal value;

a evaluating said subject matter question signal values with a stored question signal values and returning as a match only those stored question signal values having a weight equal to or an excess of a threshold weight value.

3. The method of claim 2 wherein said threshold corresponds to at least 75% identity of said text signal values.

4. The method of claim 1 further comprising the step of interactively searching said question database.

5. The method of claim 1 further comprising the step of searching said answer database directly and returning signals corresponding to a one of said stored answers having text or input parameter signal values that matches a one of said subject question text or said corresponding input parameter signal values.

6. The method of claim 1 further comprising the steps of maintaining said question and answer databases including the steps of generating, for each of said stored questions, signals corresponding to a text file identifying values of said input parameters for said question;

generating, for each of said stored answers, signals corresponding to a text file identifying values of said input parameters for said answer;

copying said input parameter text files for each of said questions and associated answers to a storage device; and converting a copy of said question and said answer input parameter text files to a combined document file.

7. A system for generating a response document prepared in reply to a request for product information, said request including a plurality of questions, the system comprising:

a means for receiving signals indicative of the questions in a text form;

a means for formatting said question text signals into a corresponding plurality of individual questions;

a means for assigning each of said individual formatted question signals identifier signals;

a means for associating with said formatted question signals, signals indicative of values of associated input parameters;

a means for searching a database having stored therein signals corresponding to a plurality of stored questions, each of said stored questions having associated therewith input parameter signals, said stored questions further being associated with signals corresponding to at least one answer stored on an answer database;

a means for returning signals corresponding to a one of said stored questions having text or input parameter signal values that matches a one of said subject question text or said corresponding input parameter signal values;

a means for selecting a one of said stored answer signal values associated with said returned question;

a means for associating each of said subject question signal values with the corresponding one of said selected answer signal values;

a means for assembling said response document so that each of said subject questions and said corresponding answers are located in proximity with one another; and a means for outputting said response document.

8. The apparatus of claim 7 further comprising a means for of maintaining said question and answer databases including:

means for generating, for each of said stored questions, signals corresponding to a text file identifying values of said input parameters for said question;

means for generating, for each of said stored answers, signals corresponding to a text file identifying values of said input parameters for said answer;

means for copying said input parameter text files for each of said questions and associated answers to a storage device; and means for converting a copy of said question and answer input parameter text files file to a combined document file.

9. The apparatus of claim 7 further comprising:

a word processor means for receiving electrical signal equivalents of the subject questions;

a database retrieval means for retrieving questions and answers from said question and answer databases; and a text searching means for comparing said subject question text with text of said retrieved questions and answers and returning selected ones of said questions and answers in dependence on a preselected threshold match of said text and said input parameters between said subject question and said stored questions.

10. The apparatus of claim 7 further comprising a controller receiving control signals from said input device and generating therefrom signals corresponding to a selected one of said returned questions and thereafter pasting a copy of an answer associated with said returned question in said response document.

11. The method of claim 1 further comprising the steps of generating signals indicative of a status of each of said questions and answers;

interrogating said question and answer databases for a select one of said questions or answers;

generating signals corresponding to a work copy of said selected question or answer, including signals corresponding to text and attribute values;

retrieving, for said selected question, signals corresponding to an answer associated with said selected question;

retrieving, for selected answer, signals corresponding to all questions associated with said selected answer;

editing said text or a value of said attributes, producing edited work copy signals;

replace said question or answer database signals corresponding to said question or answer with said edited work copy signals; and generating signals indicative of a changed question or answer status.

12. The method of claim 11 wherein said status signals further comprise signals indicative of:

(1) closed—a question and answer were found in the database;

(2) send new question—an answer was found but the exact question was not found in the database and has been forwarded to database maintenance;

(3) send new answer—a question and answer were found with other attributes and new answer has been forwarded to database maintenance;

(4) send new Q/A pair—neither question or answer were not found in the database and have been forwarded to the database maintenance;

(5) send revised answer—an answer was found that needs modifications and has been forwarded to the database maintenance;

(6) send revised attributes—an answer was found that needs modification to its attributes and has been forwarded to database maintenance;

(7) pending—question for which an answer has been "used" but has not yet been closed;

(8) referred—a question that was referred to an subject matter expert for answering;

(9) NAQ—a question that is prospect or site specific or requires a table, standard exhibit or illustration as an answer.

13. The method of claim 12 further comprising the steps of monitoring the question and answer databases, including the steps of;

establishing an initial question and answer status;

querying the question and answer databases in accordance with signals indicative of a question and answer threshold date and subject matter expert status;

creating signals associated with said monitored questions and answers indicative of subject matter expert status;

removing from said question and answer databases questions and answers which have been retained therein beyond said threshold date; and generating report signals indicative of the status of said monitored questions and answers as compared the threshold date and subject matter expert status.

14. The method of claim 13 further comprising the steps of generating status signals indicative of legal review.

\* \* \* \* \*